US010577117B2

(12) United States Patent
Haile et al.

(10) Patent No.: US 10,577,117 B2
(45) Date of Patent: Mar. 3, 2020

(54) ANGLED ACOUSTIC HONEYCOMB

(71) Applicant: Hexcel Corporation, Dublin, CA (US)

(72) Inventors: Merid Haile, Phoenix, AZ (US);
Andres Baca, Gilbert, AZ (US); Lisa D. Bowen, Arizona City, AZ (US);
Whitney Dailey, Gilbert, AZ (US)

(73) Assignee: HEXCEL CORPORATION, Dublin, CA (US)

( * ) Notice: Subject to any disclaimer, the term of this patent is extended or adjusted under 35 U.S.C. 154(b) by 358 days.

(21) Appl. No.: 15/669,007

(22) Filed: Aug. 4, 2017

(65) Prior Publication Data

US 2019/0039745 A1    Feb. 7, 2019

(51) Int. Cl.
| | | |
|---|---|---|
| B64D 33/04 | (2006.01) | |
| F02C 7/045 | (2006.01) | |
| G10K 11/172 | (2006.01) | |
| B64D 33/02 | (2006.01) | |
| F02K 1/82 | (2006.01) | |
| B64C 1/40 | (2006.01) | |
| G10K 11/16 | (2006.01) | |
| E04C 2/36 | (2006.01) | |
| F04D 29/66 | (2006.01) | |

(52) U.S. Cl.
CPC .............. *B64D 33/02* (2013.01); *B64C 1/40* (2013.01); *F02C 7/045* (2013.01); *F02K 1/827* (2013.01); *G10K 11/172* (2013.01); *B64D 2033/0206* (2013.01); *E04C 2/365* (2013.01); *F04D 29/663* (2013.01); *F05D 2230/60* (2013.01); *F05D 2250/283* (2013.01); *F05D 2260/96* (2013.01); *F05D 2260/963* (2013.01)

(58) Field of Classification Search
CPC .... G10K 11/172; G10K 11/161; G10K 11/16;
F02C 7/045; F02C 7/24; F02K 1/827;
B64D 33/06; B64D 2033/0206; B32B
3/12; B32B 3/10; F05D 2260/96
See application file for complete search history.

(56) References Cited

U.S. PATENT DOCUMENTS

| | | | | |
|---|---|---|---|---|
| 3,821,999 A | | 7/1974 | Guess et al. | |
| 3,850,261 A | * | 11/1974 | Hehmann | ................. F02C 7/24 |
| | | | | 181/286 |
| 3,952,831 A | * | 4/1976 | Bernard | .................... B32B 3/12 |
| | | | | 181/292 |

(Continued)

FOREIGN PATENT DOCUMENTS

WO        9212854 A1    6/1992

OTHER PUBLICATIONS

International Search Report and Written Opinion for PCT Patent Application No. PCT/US2018/042210, dated Oct. 10, 2019.

*Primary Examiner* — Edgardo San Martin
(74) *Attorney, Agent, or Firm* — W. Mark Bielawski;
David J. Oldenkamp

(57) ABSTRACT

Acoustic structures in which acoustic septa are located in the angled cells of a honeycomb for reducing the noise generated from a source. The honeycomb used to form the acoustic structure has cell walls that extend at an angle relative to the honeycomb edges such that the depth of the honeycomb cells is greater than the honeycomb core thickness. The acoustic septa are formed by inserting planar acoustic inserts into the angled honeycomb cells to form septum caps which are friction-locked within the angled cells and then permanently bonded in place.

12 Claims, 5 Drawing Sheets

(56) References Cited

U.S. PATENT DOCUMENTS

| | | | |
|---|---|---|---|
| 5,445,861 A * | 8/1995 | Newton | B32B 3/12 |
| | | | 428/116 |
| 6,536,556 B2 * | 3/2003 | Porte | B32B 3/12 |
| | | | 181/284 |
| 7,434,659 B2 | 10/2008 | Ayle | |
| 7,510,052 B2 | 3/2009 | Ayle | |
| 7,854,298 B2 | 12/2010 | Ayle | |
| 8,047,329 B1 * | 11/2011 | Douglas | G10K 11/172 |
| | | | 181/292 |
| 8,066,098 B2 | 11/2011 | Ayle | |
| 8,607,924 B2 | 12/2013 | Ichihashi | |
| 8,733,500 B1 * | 5/2014 | Ayle | G10K 11/172 |
| | | | 181/292 |
| 8,997,923 B2 * | 4/2015 | Ichihashi | B32B 3/10 |
| | | | 181/292 |
| 9,016,430 B2 | 4/2015 | Ichihashi | |
| 9,469,985 B1 | 10/2016 | Ichihashi | |
| 9,476,359 B2 * | 10/2016 | Soria | F02K 1/827 |
| 9,514,734 B1 | 12/2016 | Jones et al. | |
| 9,620,102 B1 * | 4/2017 | Ichihashi | B64D 33/02 |
| 9,650,963 B2 * | 5/2017 | Nampy | B64D 33/02 |
| 2007/0272483 A1 * | 11/2007 | Morin | F02C 7/045 |
| | | | 181/292 |
| 2014/0090923 A1 * | 4/2014 | Murray | F02K 3/06 |
| | | | 181/222 |
| 2015/0110603 A1 | 4/2015 | Biset et al. | |

\* cited by examiner

ANGLED ACOUSTIC HONEYCOMB

BACKGROUND OF THE INVENTION

1. Field of the Invention

The present invention relates generally to acoustic structures that are used to damp or suppress noise that emanates from a specific source. More particularly, the present invention is directed to providing acoustic honeycomb where the depth of the acoustic cells in the honeycomb is greater than the thickness of the honeycomb in order to provide suppression of lower frequency noise.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed with a solid sound impermeable sheet or skin at the end located away from the engine and covered with a porous or perforated sound permeable covering at the end located closest to the engine. The closing of the honeycomb cells with acoustic material in this manner creates an acoustic resonator that provides attenuation, damping and/or suppression of the noise. Acoustic septums are also usually incorporated into the interior of the honeycomb cells in order to provide the resonator with additional noise attenuation properties.

One way of incorporating acoustic septums into the honeycomb cells is to first form planar acoustic inserts from an acoustic material, such as an acoustic mesh or perforated acoustic film. The planar acoustic inserts are made larger than the cell openings. Accordingly, when the inserts are pushed into the cells with a plunger, they are folded into an acoustic septum in the form of a cap. The cap shape provides an anchoring portion or tabs, which contact the cell walls, and a transverse central septum portion which attenuates the sound waves in the cell. Once inserted into the cells, the friction between the anchoring portion of the acoustic septum cap and the honeycomb walls temporarily locks the acoustic septum cap in place. An adhesive is then applied to permanently bond the anchoring portions of the inserted acoustic septum caps to the cell walls.

The permanent bonding of the acoustic septum caps is typically accomplished by dipping the entire honeycomb into a pool of liquid adhesive. The depth to which the honeycomb is dipped into the adhesive is chosen so that the anchoring portions of the inserted acoustic septum caps are immersed in the liquid adhesive. This adhesive dip process is particularly effective because it provides simultaneous bonding of the many hundreds of acoustic septums that are located within a typical acoustic honeycomb.

The insertion of septum caps into honeycomb to form an acoustic honeycomb is described in U.S. Pat. Nos. 7,434,659; 7,510,052, 7,854,298 and 9,016,430. As set forth in these issued patents, friction-locking of the septum caps is an important aspect of the septum-insertion procedure. For example, the septums may shift or otherwise move during handling if friction-locking is not adequate. Any shifting of the septums makes it difficult to apply adhesive uniformly to the septums during bonding. Shifting of the septums also causes uncontrolled altering of the acoustic properties. In the worst case, the septum may fall completely out of the honeycomb cell if friction locking is not adequate.

The honeycomb used in acoustic treatments typically have hexagonal cells where the cell walls are perpendicular to the edges of the honeycomb. The perpendicular cell walls have been well suited for the use of acoustic septum inserts, because the perpendicular wall orientation allows conveniently alignment and operation of the insertion tooling during the placement of the septa within the honeycomb cells. The perpendicular cell wall orientation also provides for uniform bonding of the septa once they are friction-locked at the same depth within the cell. The honeycomb is typically immersed into the adhesive pool with the honeycomb edges being parallel to the horizontal pool surface. The perpendicular orientation of the cell walls ensures that adhesive is applied to the anchoring portions at the same level during the immersion step.

A basic problem facing acoustic engineers is to make the nacelle as thin and lightweight as possible while still providing adequate suppression or damping of the sound wave frequencies over the entire range of noise generated by the jet engine. This basic design problem is complicated by the fact that the trend in newer models of large jet engines is to produce additional noise at lower frequencies. The new engine designs tend to use fewer fan blades that produce more by-pass air at a slower velocities. This results in the production of engine noise having a lower frequency.

The particular frequencies of noise that are suppressed by a given honeycomb cell or resonator is directly related to the depth of the cell. In general, as the frequency of the noise decreases, the depth of the cell must be increased in order to provide adequate damping or suppression. Relatively thin nacelles having cell depths on the order of 1 inch (2.5 cm) or less are adequate for absorbing the higher frequency ranges generated by a jet engine. However, in order to absorb the lower frequencies that are being generated by newer jet engines, acoustic cell or resonator depths on the order of 2.5 inches (6.4 cm) or more are required.

One approach to solving the problem of absorbing the lower frequency jet noise is to simply build nacelles with deeper cells. However, this results in an increase in the size and weight of the nacelle which is contrary to the design goal of providing nacelles that are as thin and light weight as possible. In addition, the increase in weight and size of the nacelle required to absorb low-frequency noise may be unacceptable, especially for larger aircraft engines where the size and weight of the nacelle is a major engineering design consideration.

There presently is a need to design engine nacelles and other acoustic structures where the acoustic structure is capable of suppressing a wider range of noise frequencies without increasing the thickness or weight of the nacelle acoustic structure.

SUMMARY OF THE INVENTION

In accordance with the present invention, it was discovered that angled cell wall orientations, where the cell walls are not perpendicular to the honeycomb edges, may be used in combination with inserted acoustic septa to provide acoustic structures where the depth of the acoustic cell or resonator is greater than the thickness of the honeycomb. The invention provides for suppression of noise at lower frequencies than is possible when using honeycomb with perpendicular cell walls where the depth of the cells is equal to the core thickness of the honeycomb.

The use of honeycomb with angled cells to make acoustic structures presents practical problems which are not present when dealing with honeycomb having perpendicular cells. For example the initial placement of the septum inserts within the cells is more difficult when the cell walls are not perpendicular to the honeycomb edges. In addition, adhesive bonding of the septum caps within the cells becomes problematic because the angled orientation of the friction-locked septum caps causes non-uniform application of adhesive during immersion of the angled honeycomb in the adhesive pool. As a feature of the invention, it was discovered that acoustic septum inserts could be designed to account for the problems associated with insertion into angled cells and to also account for the problems associated with application of adhesive to the septum caps once they are friction-locked within the angled cells.

The present invention is directed to acoustic structures in which acoustic septa are located in the cells of an angled honeycomb for reducing the noise generated from a source. The angled honeycomb has a first edge to be located closest to the source of noise and a second edge wherein the first edge defines a first plane having a length direction and a width direction and wherein the second edge defines a second plane having a length direction and a width direction. The first and second planes are parallel to each other and spaced apart to define a core thickness, which is the perpendicular distance between the planes. The angled honeycomb is composed of cells having a depth defined by cell walls that extend parallel to each other between the first edge and second edge of the angled honeycomb. As a feature of the invention, the cell walls extend at an angle relative to the first and second planes such that the depth of the cells is greater than the core thickness.

As a further feature or the invention, acoustic septa are located within the angled cells. Each acoustic septum includes a planar acoustic portion extending transverse to the angled cell walls. The planar acoustic portion has a top side located nearest to the first edge of the angled honeycomb and a bottom side located nearest to the second edge of the angled honeycomb. The planar acoustic portion is surrounded by a boundary that defines the planar acoustic portion. Tab portions protrude from the planar acoustic portion at the boundary. The tab portions function as the anchoring portion of the acoustic septum. The tab portions are bonded to the walls of the angled cells to provide permanent attachment of the septum within the acoustic honeycomb.

The cell walls of each honeycomb cell have interior cell surfaces that define the cell. The cell may be characterized as having a left side where a first wall, which has a first interior cell surface, is located. The cell may be further characterized as having right side where a second wall, which has a second interior cell surface, is located. The boundary of the planar acoustic portion includes a left boundary where a left tab portion, which is bonded to the first interior cell surface, protrudes from the boundary a left tab length. A right tab portion, which is bonded to the second interior cell surface, protrudes from the boundary a right tab length. As a feature of the invention, the left tab portion is longer than the right tab portion to ensure proper orientation of the septum in the angled cell during septum insertion and to provide for adequate bonding of the septum to the cell walls.

The present invention is directed to the planar acoustic septum inserts that are inserted into the angled honeycomb cells to form septum caps that are friction-locked within the cells. The invention is also directed to the angled honeycomb with the septum caps friction-locked therein as well as the acoustic honeycomb in which the septum caps have been permanently bonded to the cell walls. The invention is directed to the acoustic structures which contain the acoustic honeycomb, including acoustic liners or panels and other acoustic treatments that are used in connection with sound damping of jet engines and other sources of noise. In addition, the invention covers methods for making the planar acoustic septum inserts, as well as methods for making angled acoustic honeycomb and the acoustic structures in which the angled acoustic honeycomb are located.

The above described and many other features and attendant advantages of the present invention will become better understood by reference to the following detailed description when taken in conjunction with the accompanying drawings.

DETAILED DESCRIPTION OF THE INVENTION

Figure 1:
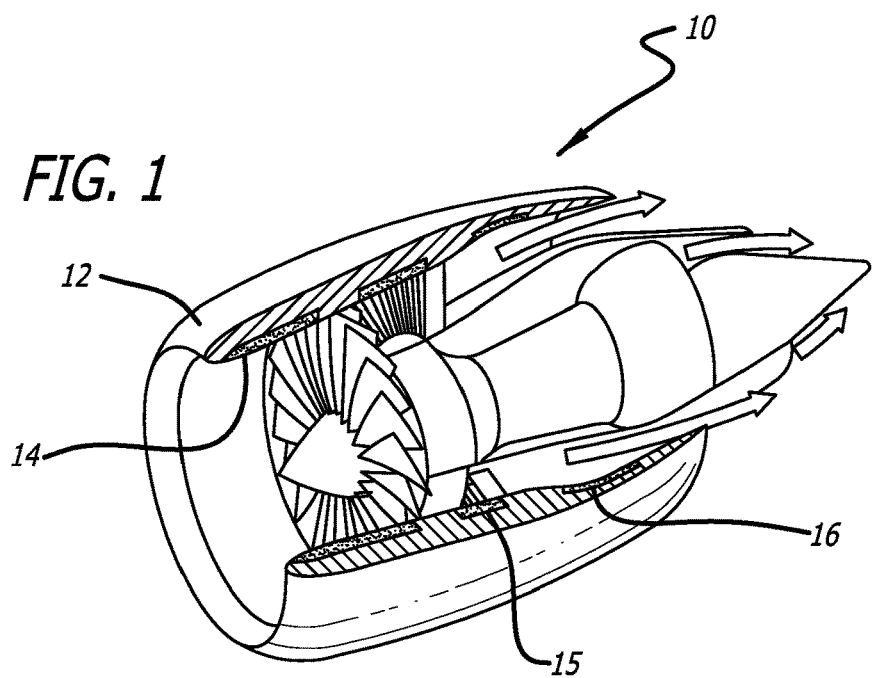
FIG. 1 is a simplified view of a jet engine that includes acoustic structures in accordance with the present invention.

Although the acoustic structures of the present invention may be used for damping noise from a wide variety of noise sources, the acoustic structures are particularly well-suited for damping noise generated by aircraft engines and particularly the large engines used for commercial aircraft. A partial sectional view of an aircraft jet engine is shown at 10 in FIG. 1. The nacelle 12 of the jet engine 10 includes acoustic structures in the form of acoustic liners or panels 14, 15 and 16 that surround the engine and provide sound attenuation and damping.

Figure 2:
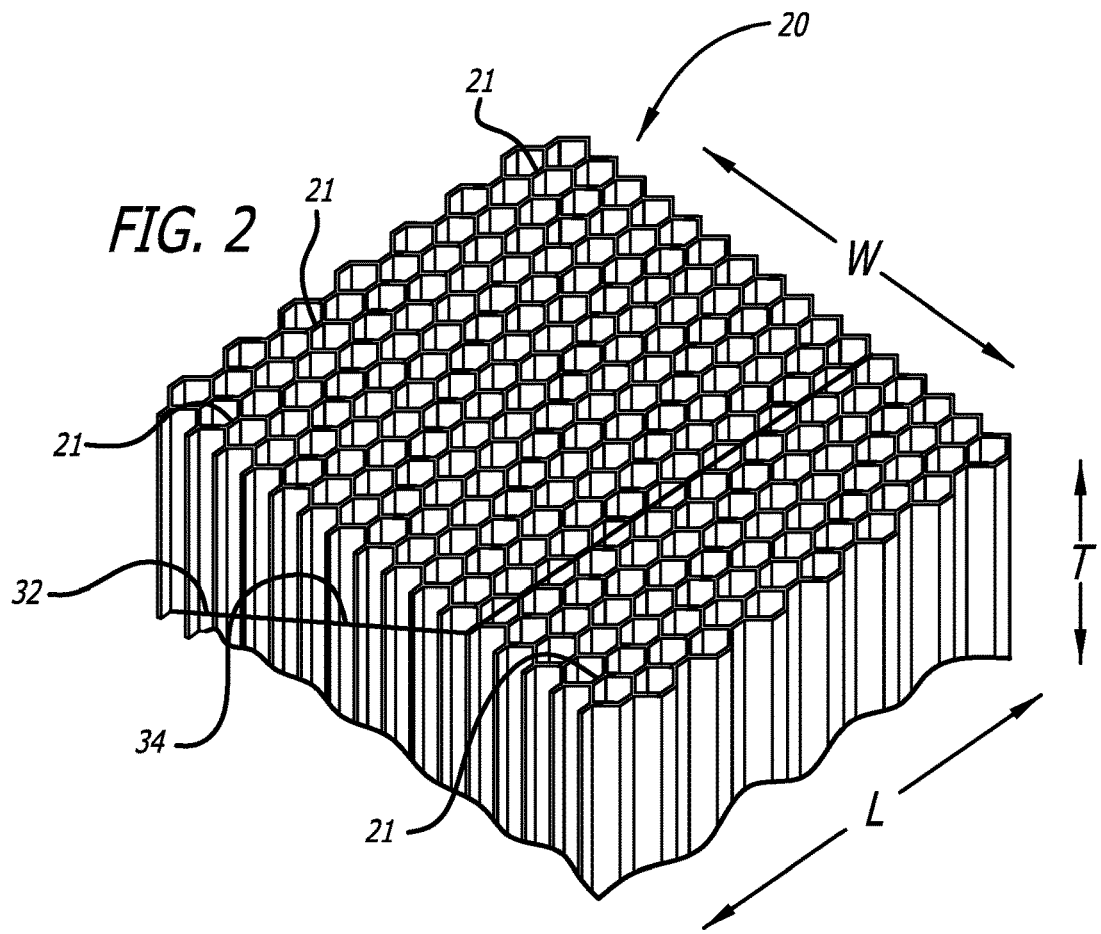
FIG. 2 shows a portion of an exemplary conventional honeycomb in which the cells are perpendicular to the honeycomb edges. The honeycomb is shown prior to it being cut to form an angled honeycomb for use in making angled acoustic structures in accordance with the present invention.

A portion of a typical honeycomb that is used in acoustic liners and other acoustic structures for jet engines is shown at 20 in FIG. 2. The honeycomb 20 has a width (W) direction, a length (L) direction and a thickness (T) direction. The honeycomb cells are perpendicular to the edges of the honeycomb so that the depth of the cells is equal to the thickness of the honeycomb (core thickness). In general, the honeycomb cells will typically have a core thickness ranging from 0.25 (0.64 cm) to 3 inches (7.6 cm) or more. Cross-sectional areas of the cells will range from 0.05 square inch (0.32 square cm) to 1 square inch (6.4 square cm) or more. For the acoustic liners used in jet engine nacelles, the honeycomb core thickness, and corresponding cell depths, will typically range from about 1.0 (2.5 cm) to 2.0 inches (5.1 cm). The honeycomb includes node walls, four of which are shown at 21.

In accordance with the present invention, the cells are not perpendicular to the cell edges as shown in FIG. 2. Instead, the cells are angled relative to the honeycomb edges so that the depth of the honeycomb cells is greater than the core thickness. The ability to take a honeycomb that has a certain core thickness and increase the effective resonator length (cell depth) is a significant advantage, since it allows one to make acoustic liners that are as thin and lightweight as possible, while still being able to suppress the relatively lower frequency noise that is being generated by current jet engine designs. For example, in a honeycomb that has a core thickness of 1.7 inch (4.3 cm), a cell depth of 2.4 (6.1 cm) inches can be obtained by angling the cells at an angle of 45° relative to the honeycomb edges.

Figure 3:
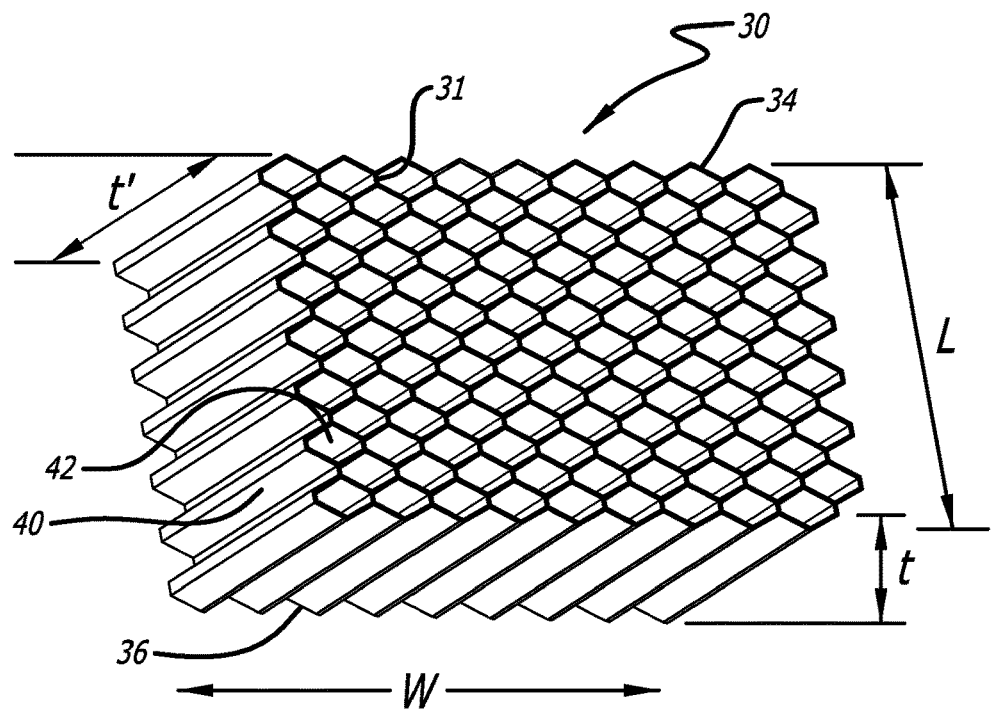
FIG. 3 shows an exemplary angled honeycomb where the cell wall are angled at 45° with respect to the edges of the honeycomb.

An angled honeycomb that is suitable for use in making angled acoustic structures according to the invention is shown at 30 in FIG. 3. The angled honeycomb 30 is preferably made by slicing a perpendicular honeycomb, as shown at 32 in FIG. 2, in order to form a first edge 34 of the angled honeycomb. The perpendicular honeycomb 20 is further sliced parallel to slice 32 (not shown) in order to form a second edge 36 of the angled honeycomb 30. The angled honeycomb may be made by other suitable methods, such as molding. However, it is preferred that honeycomb, which is designed for use in acoustic structures and which has perpendicular cells, is appropriately sliced to form an angled honeycomb.

The honeycomb 20 that is sliced to make the angled honeycomb 30 can be any of those typically used to in acoustic structures, such as metals and composite materials. Exemplary metals include aluminum and aluminum alloys. Exemplary composite materials include fiberglass, resin impregnated aramid paper, such as Nomex®, and various combinations of graphite fibers with suitable matrix resins. Matrix resins that can withstand relatively high temperatures (150 to 200° C.) are preferred.

The first edge 34 of the angled honeycomb is located closest to the interior of the jet engine or other source of noise. The first edge 34 defines a first plane having a length direction (L) and width direction (W) that corresponds to the L and W directions shown in FIG. 2. The second edge 36 defines a second plane that also has the same L and W directions. The first and second planes are parallel to each other and define the core thickness (t), which is the perpendicular distance between the two planes. The angled honeycomb 30 also has an angled core thickness (t') which is equal to the depth of the angled cells.

Figure 4:
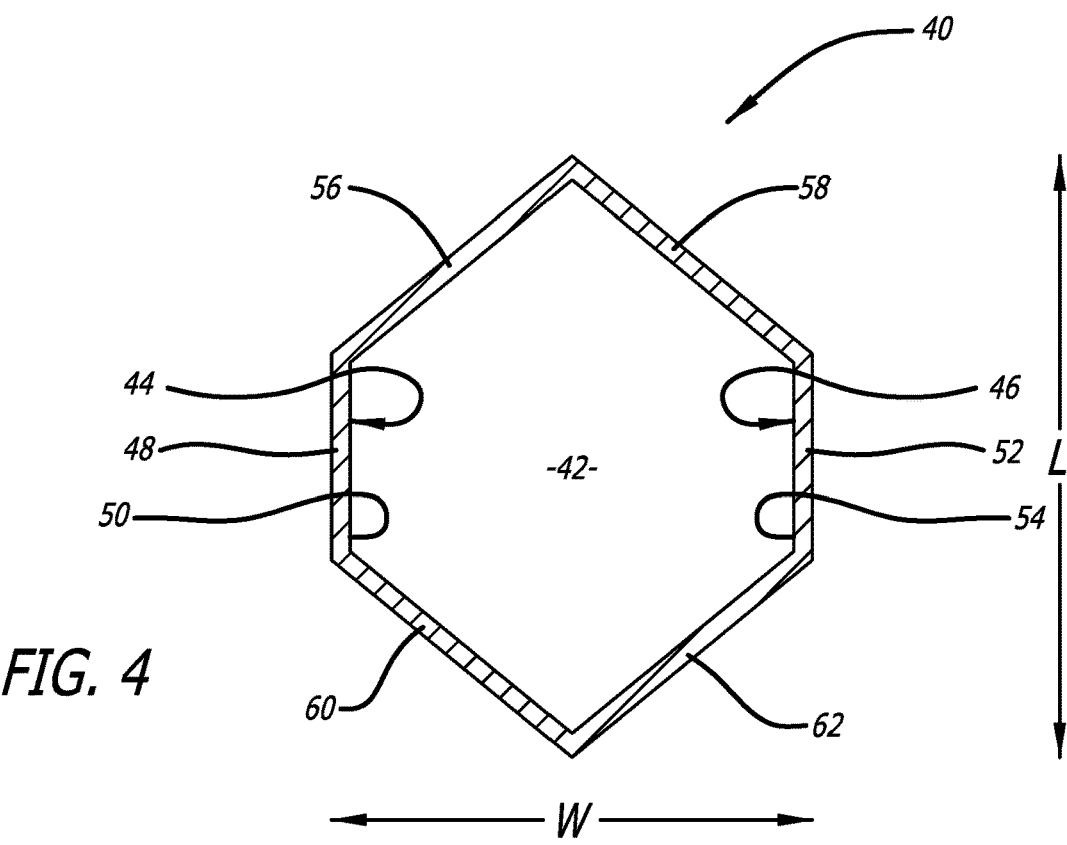
FIG. 4 is a top cross-sectional view of a single cell from the angled honeycomb shown in FIG. 3.

A detailed view of a single cell from the angled honeycomb 30 is shown at 40 in FIG. 4. The cell 40 is oriented in the same W and L directions as shown in FIGS. 2 and 3. The cell 40 includes interior cell surfaces that define the cell 42. The cell has a left side 44 and a right side 46. The cell walls include a first wall 48 located at the left side of the cell. The first wall has a first interior cell surface 50. A second cell wall 52 is located at the right side of the cell. The second cell wall has a second interior cell surface 54. It is preferred that the first and second walls are node walls 31. Although any number of cell cross-sectional shapes are possible, it is preferred that the cells 42 have a hexagonal shape. Accordingly, the cell walls also include an upper left wall 56, an upper right wall 58, a lower left wall 60 and a lower right wall 62, which when combined with the left and right walls forms a hexagonal cell.

Figure 5:
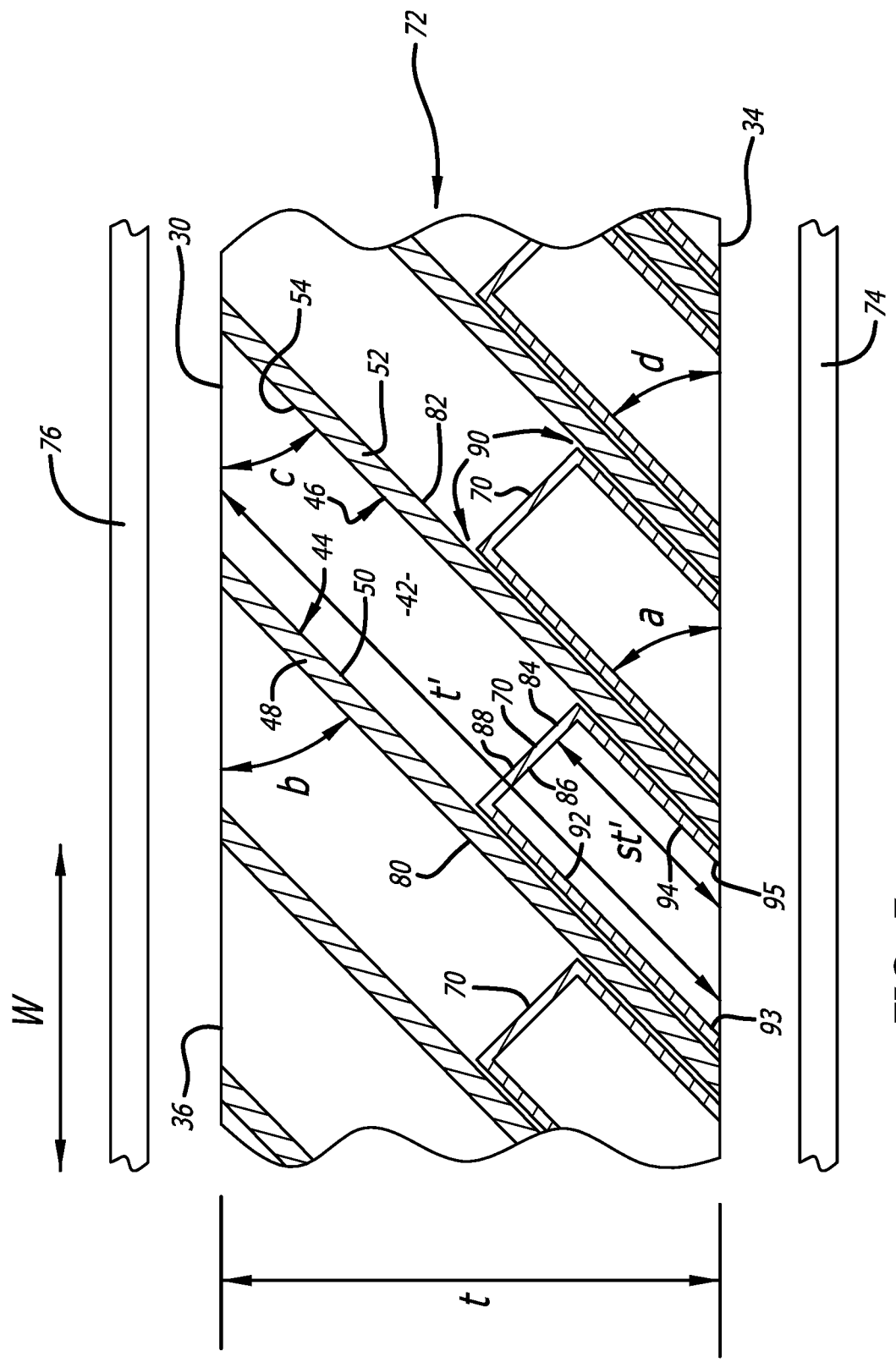
FIG. 5 is a side view of an exemplary angled acoustic honeycomb in accordance with the present invention.

FIG. 5 is a side view of a portion of the angled honeycomb 30 in which septum caps 70 have been inserted and bonded into place within the cells to form an angled acoustic honeycomb 72. The angled acoustic honeycomb 72 is numbered in FIG. 5 so that the identifying numbers correspond to the numbering of the same elements in FIGS. 3 and 4. The angled acoustic honeycomb 72 is typically made into an acoustic liner or panel by locating an acoustically porous face sheet 74 on the first edge 34 of the angled acoustic honeycomb 72. The acoustically porous face sheet allows noise to enter the acoustic cells from the jet engine or other noise source. An acoustically solid face sheet 76 is located on the second edge 36 in order to acoustically close the cells so that they are able to function as acoustic resonators.

The materials used to make the solid acoustic barrier face sheets 76 can be any of the solid face sheet materials commonly used for acoustic structures which typically include the same type of materials used to make the honeycomb structure. The materials used to make the perforated sound permeable face sheet 74 can also be any of the materials commonly used for such porous structures provided that the pores or perforations in the structure are sufficient to allow the sound waves from the jet engine or other noise source to enter into the acoustic cells or resonators.

The cell 42 in FIG. 5 is angled relative to the honeycomb edges such that the first interior cell surface 50 extends at a first interior angle (a) relative to the first edge 34 (first plane). The first wall 48 has a first exterior surface 80 which extends at a first exterior angle (b) relative to the second edge 36 (second plane). The second interior cell surface 54 extends at a second interior angle (c) relative to the second edge 36 (second plane). The second wall 52 has a second exterior surface 82 which extends at a second exterior angle (d) relative to said first edge 34 (first plane). The angles a, b, c and d are the same and should be from 30° to 75°. The preferred angle for angles a, b, c and d is from 40° to 50° in order to increase the cell depth as much as possible, while still allowing for acceptable septum insertion, friction-locking and adhesive bonding of the septa within the angled cells.

The acoustic septum caps 70 each includes a planar acoustic portion 84 that extends transverse (90°±10°) to the cell walls. The planar acoustic portion 84 has a top side 86 located nearest to the first edge 34 and a bottom side 88 located nearest to the second edge 36. The planar acoustic portion 84 is defined by a boundary 90 where the planar acoustic portion meets or is bordered by the interior faces of the cell walls. The acoustic septum caps 70 each also includes tab portions that extend at an angle (90°±10°) from the planar acoustic portion 84 to provide anchoring of the septum within the cell.

As shown in FIG. 5, a left tab portion 92 is bonded to the first interior cell surface 50 and a right tab portion 94 is bonded to the second interior cell surface 54. The left tab portion 92 is longer than the right tab 94 in order to provide for adequate application of adhesive to both tab portions when the angled honeycomb is immersed in a pool of adhesive. In addition, the right tab portion 94 must be kept sufficiently short so that it does not extend past the edge 34. The relative lengths of the right tab portion 94 and left tab portion 92 are chosen so that the ends of the tabs (shown at 95 and 93, respectively) are located at the same height (t direction) within the honeycomb. The difference in length between the left and right tab portions will vary depending upon the angle chosen for angles a-d and the cross-sectional size of the cell. Typically, the difference in length will increase as the chosen angle decreases and cell size increases.

Any of the standard acoustic materials may be used to form the septum caps 70. These acoustic materials are typically provided as relatively thin sheets that are perforated, porous or an open mesh fabric that is designed to provide noise attenuation. Perforations are formed in the solid sheet material either before or after placement within the angled honeycomb cells. Although any suitable metal, ceramic or plastic acoustic material may be used to make perforated septum caps, it is preferred that the acoustic material be polyether ether ketone (PEEK) or a similar chemically resistant polymer material that is suitable for high temperature applications. Sheets or films of PEEK are available commercially from a number of sources, such as Victrex USA (Greenville, S.C.) which produces sheets of PEEK under the tradename VICTREX® PEEK™ polymer.

When using solid films as the septum material, holes are drilled through the film within the overall boundary 90 of the planar acoustic portion 84. The holes may be drilled using a laser or other suitable hole drilling system. The various tab portions that are located outside the overall boundary 90 may remain solid or can also be drilled to varying degrees, if desired, to increase surface area and adhesive bonding of the tab portions to the cell walls.

Although perforated and porous sheets of various materials (metals, ceramics, plastics) may be used, it is preferred that at least a major part (over 50%) or all of the transverse acoustic portion of the septum cap include an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), polyamide 6 (Nylon, 6 PA6) and polyamide 12 (Nylon 12, PA12); are just a few examples. Open mesh monofilament fabric made from PEEK is a preferred acoustic material for high temperature applications. Open mesh monofilament acoustic fabrics and other acoustic materials that may be used to form the septum caps in accordance with the present invention are available from a wide variety of commercial sources. For example, sheets of open mesh monofilament acoustic fabric may be obtained from SEFAR America Inc. (Buffalo Division Headquarters 111 Calumet Street Depew, N.Y. 14043) under the trade names SEFAR PETEX, SEFAR NITEX and SEFAR PEEKTEX.

Figure 6:
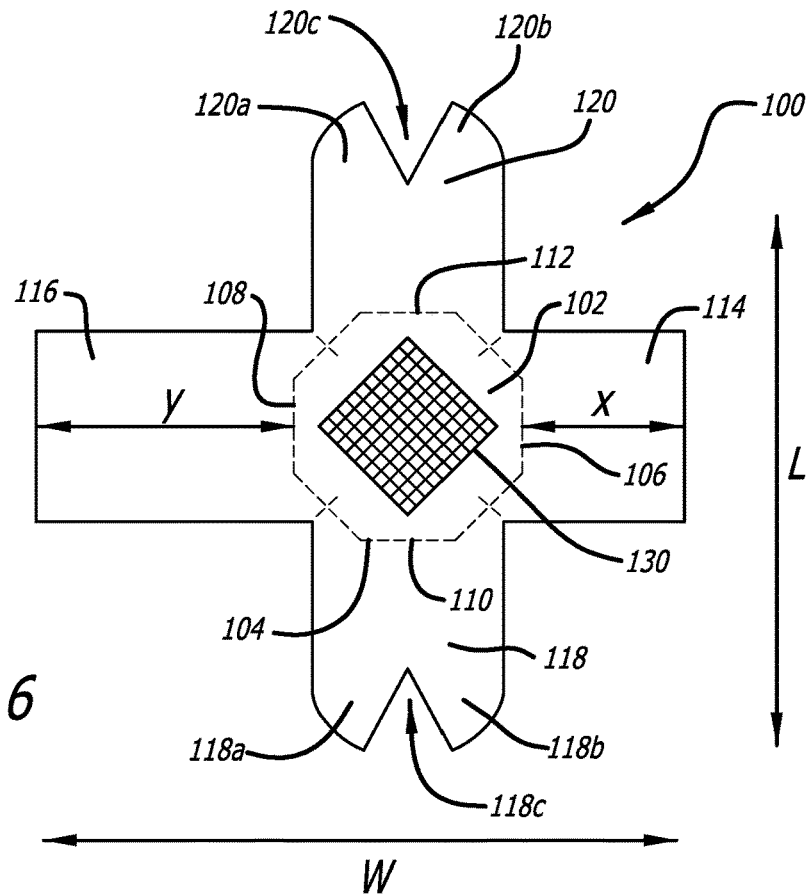
FIG. 6 is a top view of a preferred exemplary hybrid septum insert.

An exemplary acoustic septum insert, which is inserted into the angled honeycomb 30 to form an acoustic septum cap 70, is shown at 100 in FIG. 6. The acoustic septum 100 is shown oriented in the W and L directions that correspond to the way it is inserted into the angled honeycomb 30. The acoustic septum insert 100 includes a central acoustic portion 102, which has a boundary 104 (shown in phantom) that corresponds to the boundary of the planar acoustic portion 84 shown at 90 in FIG. 5. The boundary 104 includes a right boundary 106, a left boundary 108, lower boundary 110 and upper boundary 112. These various boundary sections are delineated by the hash marks in the overall boundary 104.

The acoustic septum insert 100 also includes: 1) a right tab portion 114 that protrudes from the right boundary 106 a right tab length (x); 2) a left tab portion 116 that protrudes from the left boundary 108 a left tab length (y); 3) a lower tab portion 118; and 4) an upper tab portion 120. The acoustic septum insert 100 is designed for insertion into an angled hexagonal honeycomb where the angles a-d are 45°±5°. For such angled honeycomb, it is preferred that the ratio between y and x be from 2.5:1 to 1.3:1.

The left and right tab portions may be formed in a variety of shapes depending upon the cell cross-sectional shape. The width of the left and right tab portions may be more or less than the length of the tab portions. Regular quadrangle shapes are preferred. The quadrangle shapes shown in FIG. 6 are a preferred shape where the length (y) of left tab 116 is greater than the left tab width and the length (x) of right tab 114 is approximately equal to or less than the right tab width. The left and right tab shapes and relative sizes shown in FIG. 6 are preferred for insertion into angled hexagonal honeycomb cells of the type shown in FIG. 4 (angled at 45°±5°) to ensure adequate folding and friction-locking of the acoustic septum insert as it is inserted into the honeycomb to form the acoustic septum cap.

The lower tab portion 118 includes a lower left terminal section 118a and a lower right terminal section 118b. The lower terminal sections 118a and 118b are separated by a V-shaped notch 118c. The lower left terminal section 118a is friction-locked and then bonded to lower left wall 60. The lower right terminal section 118b is friction-locked and then bonded to lower right wall 62. The lower tab portion 118 may be in the form of a rectangle that is similar to the shapes of the left and right tabs. However, the placement of a V-shaped notch in the end of the lower tab portion to separate it into a lower left terminal section 118a and lower right section 118b is preferred in order to ensure adequate folding and friction-locking of the acoustic septum insert as it is inserted into the honeycomb to form the acoustic septum cap.

The upper tab portion 120 includes an upper left terminal section 120a and a lower right terminal section 120b. The upper terminal sections 120a and 120b are separated by a V-shaped notch 120c. The upper left terminal section 120a is friction-locked and then bonded to upper left wall 56. The upper right terminal section 120b is friction-locked and then bonded to upper right wall 58. The lower tab portion 120 may be in the form of a quadrangle that is similar to the shapes of the left and right tabs. However, the placement of a V-shaped notch in the end of the upper tab portion to separate it into an upper left terminal section 120a and an upper right section 120b is preferred in order to ensure adequate folding and friction-locking of the acoustic septum insert as it is inserted into the honeycomb to form the acoustic septum cap. Acoustic septum inserts, such as insert 100 are preferred, because they include notches in both the upper and lower tab ends to provide desired folding, friction-locking and adhesive bonding with a hexagonal honeycomb cell.

Figure 7:
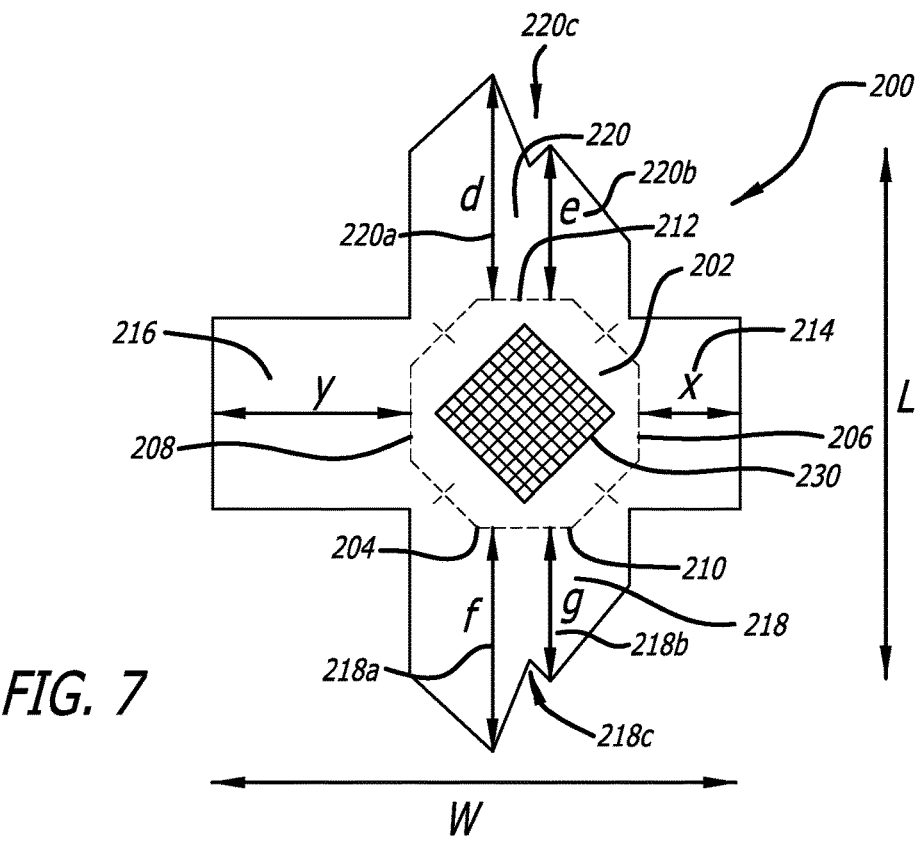
FIG. 7 is a top view of another preferred exemplary hybrid septum insert.

Another exemplary acoustic septum insert is shown at 200 in FIG. 7. The acoustic septum insert 200 is the same as the acoustic septum insert 100, except that the upper and lower right terminal sections 220b and 218c of the upper and lower tabs are shorter than the upper and lower left terminal sections 220a and 218a. The second two digits of the numbers used to identify the various elements of acoustic septum insert 200 correspond to the second two digits of the numbers used to identify the elements of acoustic septum insert 100. This is intended to mean that the above description of the various elements of acoustic septum insert 100 also apply to the corresponding elements of the acoustic septum 200.

The distance (d) that upper left terminal section 220a protrudes from the upper boundary 212 is greater than the distance (e) that the upper right terminal section 220b protrudes from the upper boundary 212. The distance (f) that the lower left terminal section 218a protrudes from the lower boundary 210 is also greater than the distance (g) that the lower right terminal section 218b protrudes from the lower boundary 210. These difference in the protrusion lengths of the upper and lower terminal sections are designed to accommodate and match the variations in the height of the adhesive that occurs from the left to right side of the acoustic septum cap during immersion of the honeycomb in the pool of adhesive. This design provides the advantages of ensuring adequate adhesive bonding of the acoustic septum cap within the angled cell while minimizing the amount of material needed to form the upper and lower tab portions. The ratio of d to e and the ratio of f to g are preferably the same and should range from 2:1 to 1.2:1 depending upon the angle of a-d and the cell size.

The acoustic septum inserts 100 and 200 are hybrid acoustic septum inserts in which an open mesh monofilament fabric 130/230 is located inside the boundary 104/204 of the transverse acoustic portion. The open mesh monofilament fabric 130/230 is combined with a solid polymer sheet or film that forms the remainder of the acoustic septum insert. Open mesh monofilament fabric is more preferred as an acoustic material than corresponding perforated polymer films or sheets. However, open mesh monofilament fabric is more expensive than corresponding solid polymer films. Accordingly, it is preferred to limit the use of open mesh monofilament fabric to the planar acoustic portion of the acoustic septum cap with the non-acoustically active portions (tabs) being made from solid or perforated polymer film. For example, a PEEK open mesh fabric 130/230 can be used to form the majority of the planar acoustic portion with the remainder of the acoustic septum insert, including the tab portions, being composed of PEEK solid film. The PEEK open mesh fabric 130/230 is heat bonded or welded to the PEEK solid film in accordance with known thermal bonding procedures. The solid film tab portions may be perforated, if desired to aid in adhesive bonding of the tab portions to the cell walls.

Figure 8:
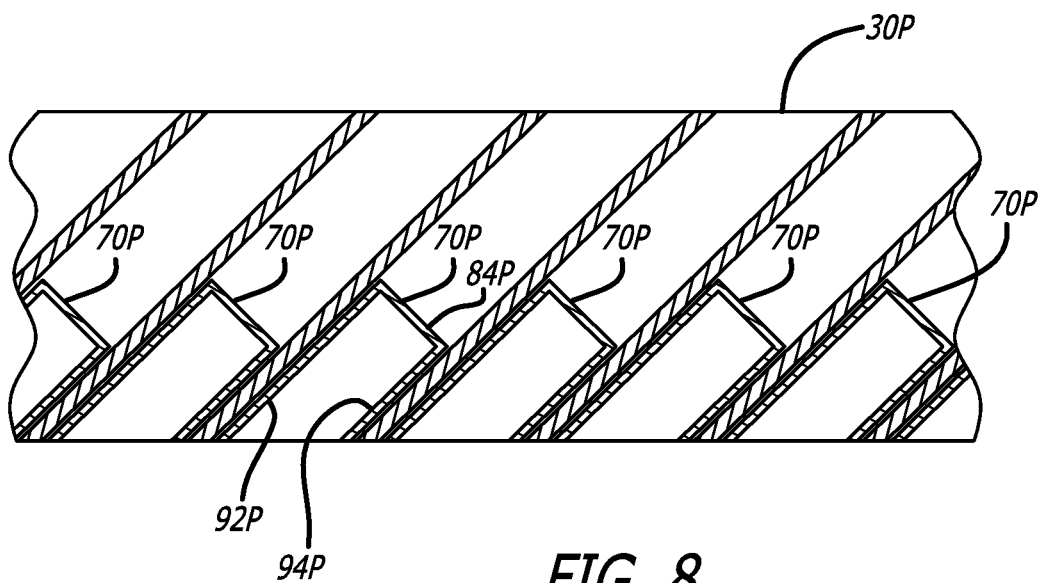
FIG. 8 is a side view showing septum inserts that have been inserted into and friction-locked with an angled honeycomb.

FIG. 8 shows a simplified side-sectional view of septum caps 70P which have been formed from planar acoustic septum inserts 100 or 200 that have been pressed into place within the angled honeycomb 30P using plunger (not shown). The identifying numbers in FIG. 8 correspond to the identifying numbers in FIGS. 3-5, except that a P is added to indicate that the honeycomb is a precursor structure that still requires permanent bonding of the septum caps 70P in order to form the angled acoustic honeycomb 72. The septum caps 70P are friction-locked in place by the inherent bounce back of the acoustic insert material. The insertion process places the planar acoustic portion 84P so that it extends transverse (90°±10°) to the cell walls at the desired insertion depth. The left tab portion 92P and right tab portions 94P are shown in their folded positions where they are friction-locked against their respective interior surfaces of the cell walls.

Figure 9:
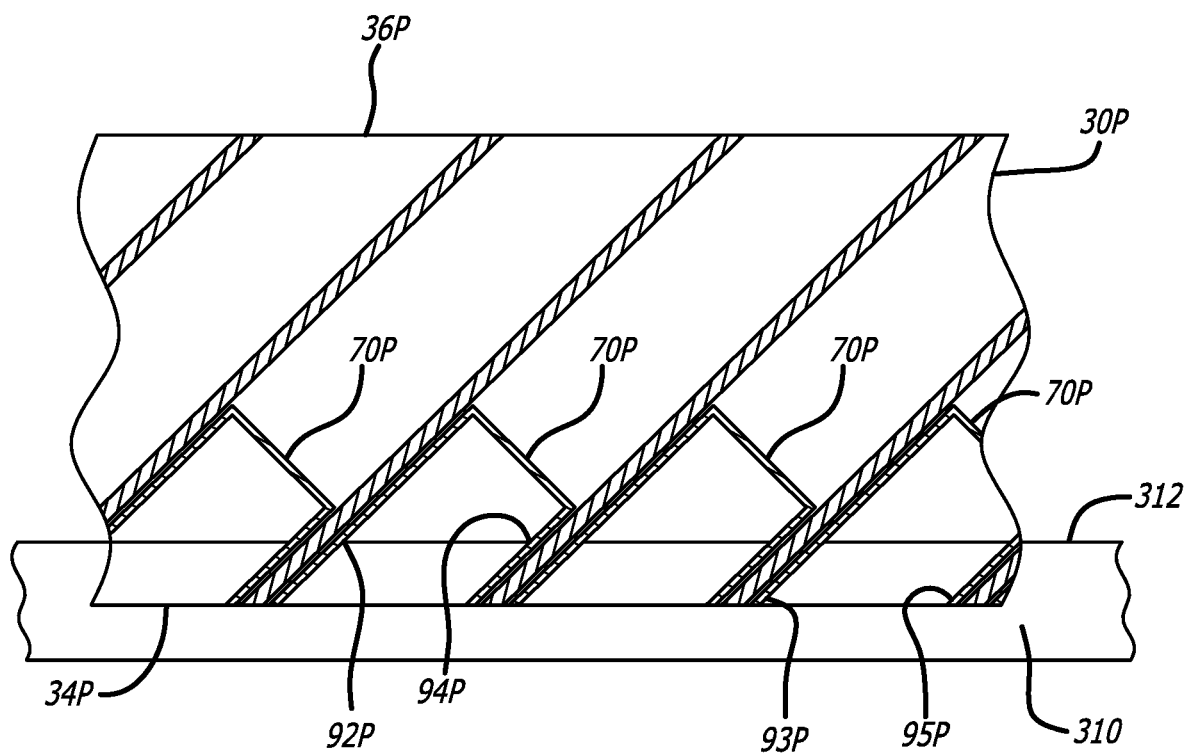
FIG. 9 is a simplified side view showing the angled honeycomb immersed in a pool of adhesive during the adhesive application step.

As shown in FIG. 9, the angled honeycomb 30P is dipped into a pool of adhesive 310 in order to apply adhesive to the all of the tab portions, including the left tab portion 92P and the right tab portion 94P. The edges 34P and 36P are kept parallel to the surface 312 of the adhesive pool during the adhesive application step in accordance with conventional practice. The angled honeycomb 30P is removed from the adhesive pool 310 and the liquid adhesive is dried or cured to form the angled acoustic honeycomb 72. This type of adhesive application procedure provides for permanent bonding of the septum caps 70P within the angled acoustic honeycomb 30P. Once formed, the angled acoustic honeycomb may be used to form a wide variety of acoustic structures.

Any of the liquid adhesives typically used to bond acoustic septum caps to honeycomb walls may be used to bond the acoustic septum caps 70P to the angled honeycomb walls. Preferred adhesives include those that are stable at high temperature (150-200° C.). Exemplary adhesives include epoxies, acrylics, phenolics, cyanoacrylates, bismaleimides, polyamide-imides, and polyimides. Polyamide-imide adhesives are preferred. The adhesives are chosen to be compatible with both the septum material and the honeycomb material.

As shown in FIG. 9, the longer left tab portion 92P receives the same amount of adhesive as the shorter right tab portion 94P due to the inserted position of the septum cap and angle of the cell walls relative to the adhesive surface 312. The ends 93P and 95P of the left and right tabs are preferably located within the angled honeycomb cells so that they are both immersed the same distance below the surface 312 of the adhesive pool. This ensures that the amount of adhesive applied to the left and right sides of each acoustic septum cap 70P is the same.

An exemplary angled hexagonal acoustic honeycomb 72 was prepared by cutting perpendicular honeycomb to form an angled honeycomb 30 in which the angles a-d were 450 and the first wall 48 and second wall 52 were node walls 31. The honeycomb was cut to provide a core thickness (t) of 1.7 inch (4.3 cm) and a cell depth (t') of 2.4 inches (6.1 cm). The cross-sectional area of the perpendicular honeycomb cells was 0.12 square inch (1.3 square cm). Acoustic septum inserts 100 were inserted into the angled honeycomb cells to form acoustic septum caps where the planar acoustic septum portions 84 were located at a depth (st') of 0.74 inch (1.9 cm) from the first edge 34.

A comparative perpendicular acoustic honeycomb was prepared from the same honeycomb used to make the angled acoustic honeycomb. The same acoustic material was used for the planar acoustic portion of the septum caps in both cases. The core thickness and cell depth of the comparative honeycomb was 1.7 inch (4.3 cm). The acoustic septum inserts were inserted so that the planar acoustic portion of the septum cap was at a depth of 0.52 inch (1.3 cm) from the first edge of the comparative honeycomb. The insertion depths of the planar acoustic portions in both cases was equal to 0.3 of the cell depth (angled acoustic honeycomb–0.74/2.4=0.3; comparative acoustic honeycomb–0.52/1.7=0.3).

Acoustic testing was performed on the angled and comparative acoustic honeycombs. The angled honeycomb was found to provide greater sound suppression at lower noise frequencies (500 to 1500 Hz). The angled acoustic honeycomb provides this increase in suppression of lower noise frequency without increasing the core thickness or core weight. The ability to damp or suppress noise at low frequencies without increasing the thickness or weight of the acoustic honeycomb panel or liner provides significant advantages when designing acoustic resonators that utilize acoustic septum caps located in honeycomb cells. These advantages are especially significant with respect to large jet engines where the size and weight of the acoustic treatments are important design considerations.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An acoustic structure in which acoustic septa are located in the cells of a honeycomb for reducing the noise generated from a source, said acoustic structure comprising:
    A) a honeycomb comprising a first edge to be located closest to said source and a second edge wherein said first edge defines a first plane having a length direction and a width direction and wherein said second edge defines a second plane having a length direction and a width direction, said first and second planes being parallel to each other and defining a core thickness, said honeycomb comprising a cell having a depth defined by cell walls that extend parallel to each other between said first edge and said second edge, said cell walls extending at an angle relative to said first and second planes such that the depth of said cell is greater than the core thickness, said cell walls defining a cell having a left side and a right side, said cell walls comprising a first wall located at the left side of said cell and a second wall located at the right side of said cell, said cell walls further comprising an upper left wall, an upper right wall, a lower left wall and a lower right wall such that said cell walls define a cell having a hexagonal cross-sectional shape;
    B) an acoustic septum cap comprising:
        a) a planar acoustic portion extending transverse to said cell walls, said planar acoustic portion having a top side located nearest to said first edge, a bottom side located nearest to said second edge, said planar acoustic portion having a boundary that comprises a left boundary, a right boundary, an upper boundary and a lower boundary;
        b) tab portions that protrude from said acoustic portion at said boundary wherein a left tab portion protrudes a left tab length from said acoustic portion at said left boundary and a right tab portion protrudes a right tab length from said acoustic portion at said right boundary, said left tab length being longer than said right tab length and wherein an upper tab portion protrudes from said acoustic portion at said upper boundary and a lower tab portion protrudes from said acoustic portion at said lower boundary;
        and
    C) an adhesive that bonds said tab portions to said cell walls wherein the amount of said adhesive that bonds said left tab portion to said left wall and the amount of said adhesive that bonds said right tab portion to said right wall are the same and wherein said adhesive bonds said upper tab portion to said upper left wall and said upper right wall and wherein said adhesive bonds said lower tab portion to said lower left wall and said lower right wall.

2. An acoustic structure according to claim 1 wherein said planar acoustic portion comprises monofilament acoustic mesh material and said tab portions comprise solid non-acoustic material.

3. An acoustic structure according to claim 1 wherein said upper tab portion has an upper end that is notched to form an upper right terminal section and an upper left terminal section, said upper right terminal section being bonded to the upper right wall and said upper left terminal section being bonded to said upper left wall and wherein said lower tab portion has a lower end that is notched to form a lower right terminal section and a lower left terminal section, said lower right terminal section being bonded to the lower right wall and said lower left terminal section being bonded to said lower left wall.

4. An acoustic structure according to claim 3 wherein said upper left terminal section protrudes a greater distance from said upper boundary than said upper right terminal section and wherein said lower left terminal section protrudes a greater distance from said lower boundary than said lower right terminal section.

5. An acoustic structure according to claim 1 wherein said cell walls comprise interior cell surfaces that define said cell, wherein said first wall has a first interior cell surface and a first exterior surface, said first interior cell surface extending at a first interior angle relative to said second plane and said first exterior surface extending at a first exterior angle relative to said first plane, wherein said second wall has a second interior cell surface and a second exterior surface, said second interior cell surface extending at a second interior angle relative to said first plane and said second exterior surface extending at a second exterior angle relative to said second plane, and wherein said first interior angle, first exterior angle, second interior angle and second exterior angle are the same angle and wherein said same angle is from 30° to 75°.

6. An acoustic structure according to claim 5 wherein said same angle is from 40° to 50°.

7. An acoustic structure according to claim 1 which includes a sound permeable sheet attached to the first edge of said honeycomb and a solid sound impermeable sheet attached to the second edge of said honeycomb.

8. A method for making an acoustic structure in which acoustic septa are located in the cells of a honeycomb for reducing the noise generated from a source, said method comprising the steps of:
    A) a honeycomb comprising a first edge to be located closest to said source and a second edge wherein said first edge defines a first plane having a length direction and a width direction and wherein said second edge defines a second plane having a length direction and a width direction, said first and second planes being parallel to each other and defining a core thickness, said honeycomb comprising a cell having a depth defined by cell walls that extend parallel to each other between said first edge and said second edge, said cell walls extending at an angle relative to said first and second planes such that the depth of said cell is greater than the core thickness, said cell walls defining a cell having a left side and a right side, said cell walls comprising a first wall located at the left side of said cell and a second wall located at the right side of said cell, said cell walls further comprising an upper left wall, an upper right wall, a lower left wall and a lower right wall such that said cell walls define a cell having a hexagonal cross-sectional shape;

B) providing an acoustic septum insert comprising:
   a) a planar acoustic portion, said planar acoustic portion having a boundary that comprises a left boundary, a right boundary, an upper boundary and a lower boundary;
   b) tab portions that protrude from said acoustic portion at said boundary wherein a left tab portion protrudes a left tab length from said acoustic portion at said left boundary and a right tab portion protrudes a right tab length from said acoustic portion at said right boundary, said left tab length being longer than said right tab length and wherein an upper tab portion protrudes from said acoustic portion at said upper boundary and a lower tab portion protrudes from said acoustic portion at said lower boundary;
C) inserting said acoustic septum insert into said cell to form an acoustic septum cap wherein said planar acoustic portion extends transverse to said cell walls, said acoustic portion having a top side located nearest to said first edge and a bottom side located nearest to said second edge; and
D) bonding said tab portions to said cell walls with an adhesive wherein the amount of said adhesive that bonds said left tab portion to said left wall and the amount of said adhesive that bonds said right tab portion to said right wall are the same and wherein said adhesive bonds said upper tab portion to said upper left wall and said upper right wall and wherein said adhesive bonds said lower tab portion to said lower left wall and said lower right wall.

9. A method for making an acoustic structure according to claim 8 wherein said planar acoustic portion is a monofilament acoustic mesh material and said tab portions are solid non-acoustic material.

10. A method for making an acoustic structure according to claim 8 wherein said upper tab portion has an upper end that is notched to form an upper right terminal section and an upper left terminal section, said upper right terminal section being bonded to the upper right wall and said upper left terminal section being bonded to said upper left wall and wherein said lower tab portion has a lower end that is notched to form an lower right terminal section and an lower left terminal section, said lower right terminal section being bonded to the lower right wall and said lower left terminal section being bonded to said lower left wall.

11. A method for making an acoustic structure according to claim 10 wherein said upper left terminal section protrudes a greater distance from said upper boundary than said upper right terminal section and wherein said lower left terminal section protrudes a greater distance from said lower boundary than said lower right terminal section.

12. A method for making an acoustic structure according to claim 8 which includes the additional steps of attaching a sound permeable sheet to the first edge of said honeycomb and attaching a solid sound impermeable sheet to the second edge of said honeycomb.

* * * * *